Apr. 10, 1923. 1,451,561
C. W. ALLEBRAND ET AL
ARM SUPPORT
Filed Aug. 5, 1921 2 sheets-sheet 2

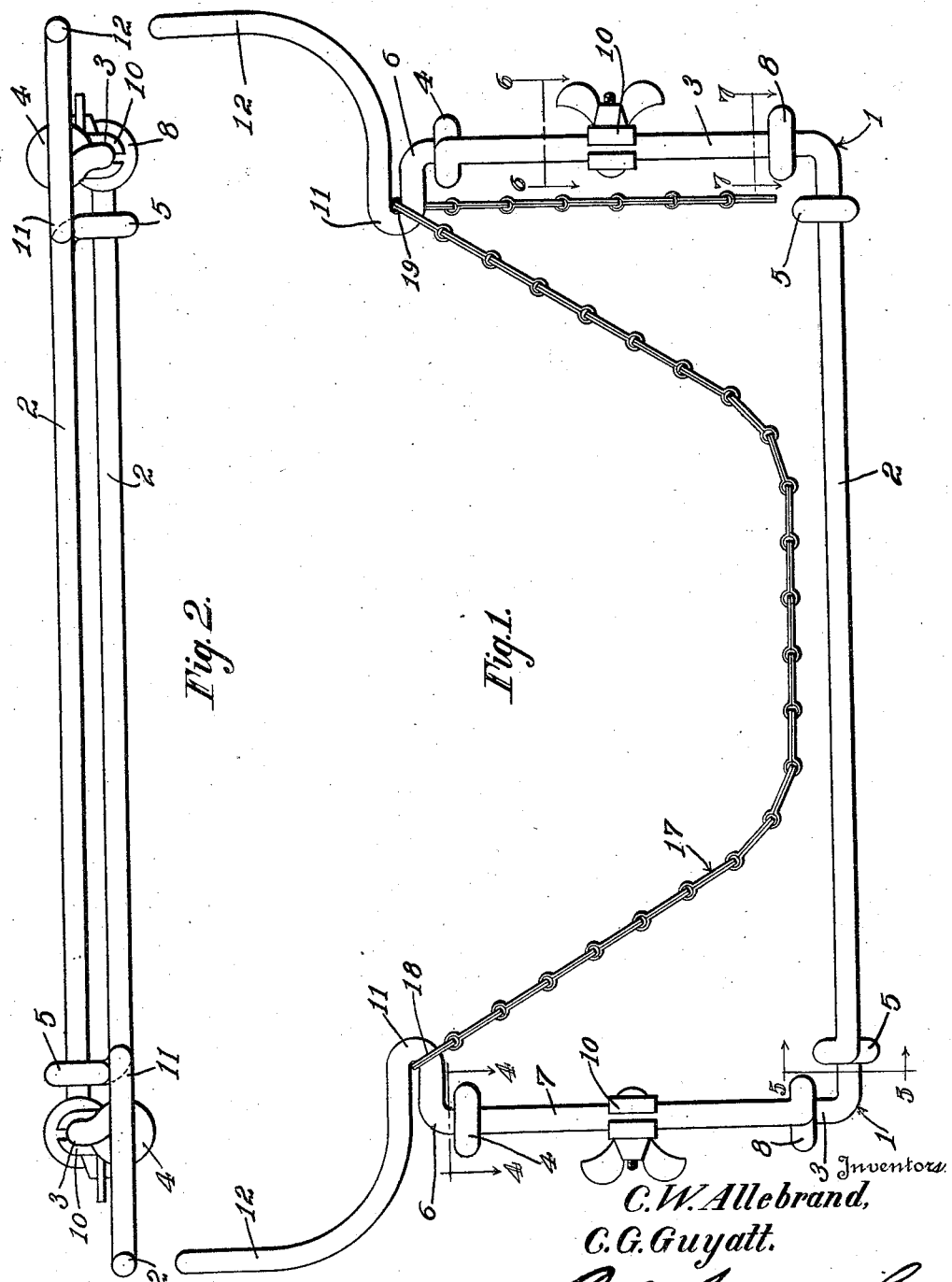

Inventors,
C. W. Allebrand,
C. G. Guyatt.
By C. A. Snow & Co.
Attorney

Patented Apr. 10, 1923.

1,451,561

UNITED STATES PATENT OFFICE.

CHARLES W. ALLEBRAND AND CHRISTOPHER G. GUYATT, OF DUQUESNE, PENNSYLVANIA.

ARM SUPPORT.

Application filed August 5, 1921. Serial No. 490,059.

*To all whom it may concern:*

Be it known that we, CHARLES W. ALLEBRAND and CHRISTOPHER G. GUYATT, citizens of the United States, residing at Duquesne, in the county of Allegheny, State of Pennsylvania, have invented a new and useful Arm Support, of which the following is a specification.

The device forming the subject matter of this application is adapted to be employed for supporting the arm of a corpse, whilst the corpse is recumbent on a bed, cooling-board or the like.

The invention aims to provide a device of the sort above mentioned which may be adjusted readily to support and carry the arm of the corpse and to position the arm as may be desired.

Another object of the invention is to provide a device of the sort above mentioned whereby both arms of the corpse may be supported from underneath the body.

A further object of the invention is to provide an arm support which may be entirely independent of the working table, bed or the like so far as connection with or attachment thereto is concerned.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed it being understood that, within the scope of what is claimed, changes in the precise embodiment of the invention shown can be made without departing from the spirit of the invention.

In the drawings:—

Figure 1 shows in elevation, a device constructed in accordance with the invention; Figure 2 is a top plan; Figure 3 is an end elevation; Figure 4 is a section on the line 4—4 of Figure 1;

Figure 6:
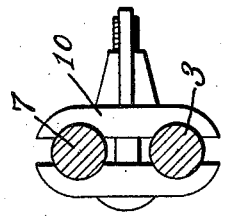
Figure 6 is a section on the line 6—6 of Figure 1.
Figure 7:
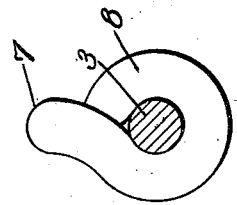
Figure 7 is a section on the line 7—7 of Figure 1.
Figure 4:
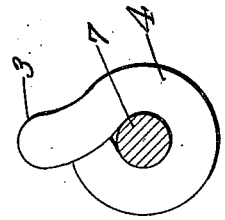
Figure 5:
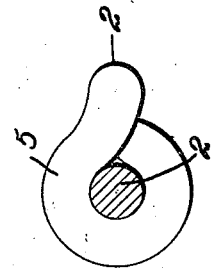
Figure 5 is a section on the line 5—5 of Figure 1.
Figure 3:
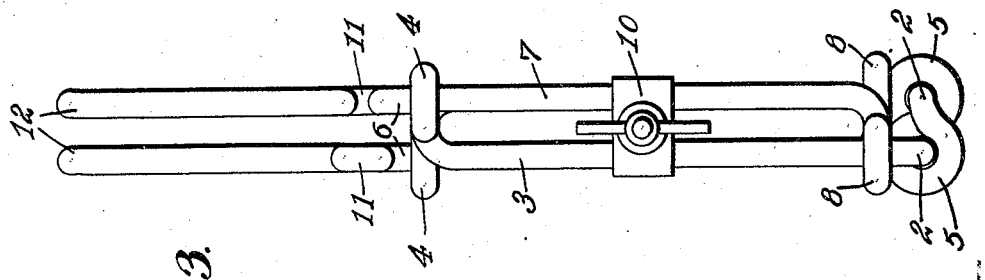

In carrying out the invention there is provided a pair of angular base members 1. Each base member 1 includes a bottom bar 2 and an upstanding part 3 disposed at right angles to the bottom bar. Each upstanding part 3 is provided with a transverse eye 4. Each bottom bar 2 has an eye 5, receiving the other bottom bar slidably. The construction is such that the base members 1 may be adjusted horizontally with respect to each other, thereby to vary the distance between the upstanding parts 3.

Vertically adjustable supports 6 are provided, each support 6 including an arm 7 slidable in the eye 4 on the part 3, each arm 7 being provided at its lower end with an eye 8 slidable on the part 3. The arm 7 of each support is connected to the corresponding part 3 by a clamp 10 under the control of an operator, and of any desired construction. Above the eyes 4, the arms 7 of the support 6 are bent upon themselves to fashion inwardly extended attaching elements 11, the upper portions of the attaching elements 11 being carried outwardly and upwardly to form fingers 12.

The numeral 17 marks a flexible sling, which may be a light chain, if desired, one end of the chain being permanently engaged at 18 with one of the attaching elements 11. The other end of the sling 17, or the intermediate portion thereof may be engaged detachably and adjustably, as shown at 19 in Figure 1 with the corresponding attaching element 11.

In practical operation, the bars 2 extend beneath the corpse, the parts 7 and 3 extending upwardly at each side of the corpse, the arms of the corpse being supported in the parts 12. The flexible sling 17 extends beneath the corpse and serves as a brace which prevents the vertical parts of the device from spreading.

The distance between the supports 6 may be adjusted, since each base member 1 includes the eye 5 which is mounted slidably on the bottom bar 2 of the other base member. The supports 6, being slidably engaged at 4 and at 8 with the up-standing parts 3 of the base members, may be adjusted vertically, it being possible to hold the supports in adjusted positions by tightening up the clamps 10 which connect the elements 7 and 3. The device may be covered with a cloth or with drapery of any sort.

Having thus described the invention, what is claimed is:—

1. In a device of the class described, base members comprising upstanding parts having eyes, supports vertically adjustable in the eyes and having eyes slidable upon said parts, each base member having an eye receiving the other base member slidably, to permit an adjustment in the distance between the supports, a flexible sling connecting the supports and clamping means cooperating with the supports and with said parts to hold the supports at adjusted heights.

2. In a device of the class described, base members comprising upstanding parts having eyes, supports vertically adjustable in the eyes, the supports being curved inwardly, above the eyes, to fashion U-shaped attaching elements, the attaching elements being carried outwardly and upwardly to form fingers, the supports having eyes slidable upon said parts of the base members, each base member having an eye receiving the other base member slidably, to permit an adjustment in the distance between the supports, a flexible sling engaged with the attaching elements, and clamping means cooperating with the supports and with said parts of the base members to hold the supports at adjusted heights.

In testimony that we claim the foregoing as our own, we have hereto affixed our signatures in the presence of two witnesses.

CHARLES W. ALLEBRAND.
CHRISTOPHER G. GUYATT.

Witnesses:
JOHN A. CONLIN,
CARL F. ALLEBRAND.